Jan. 23, 1934.   W. H. CHENEY   1,944,544
GAS GENERATING DEVICE
Filed March 16, 1933    4 Sheets-Sheet 2
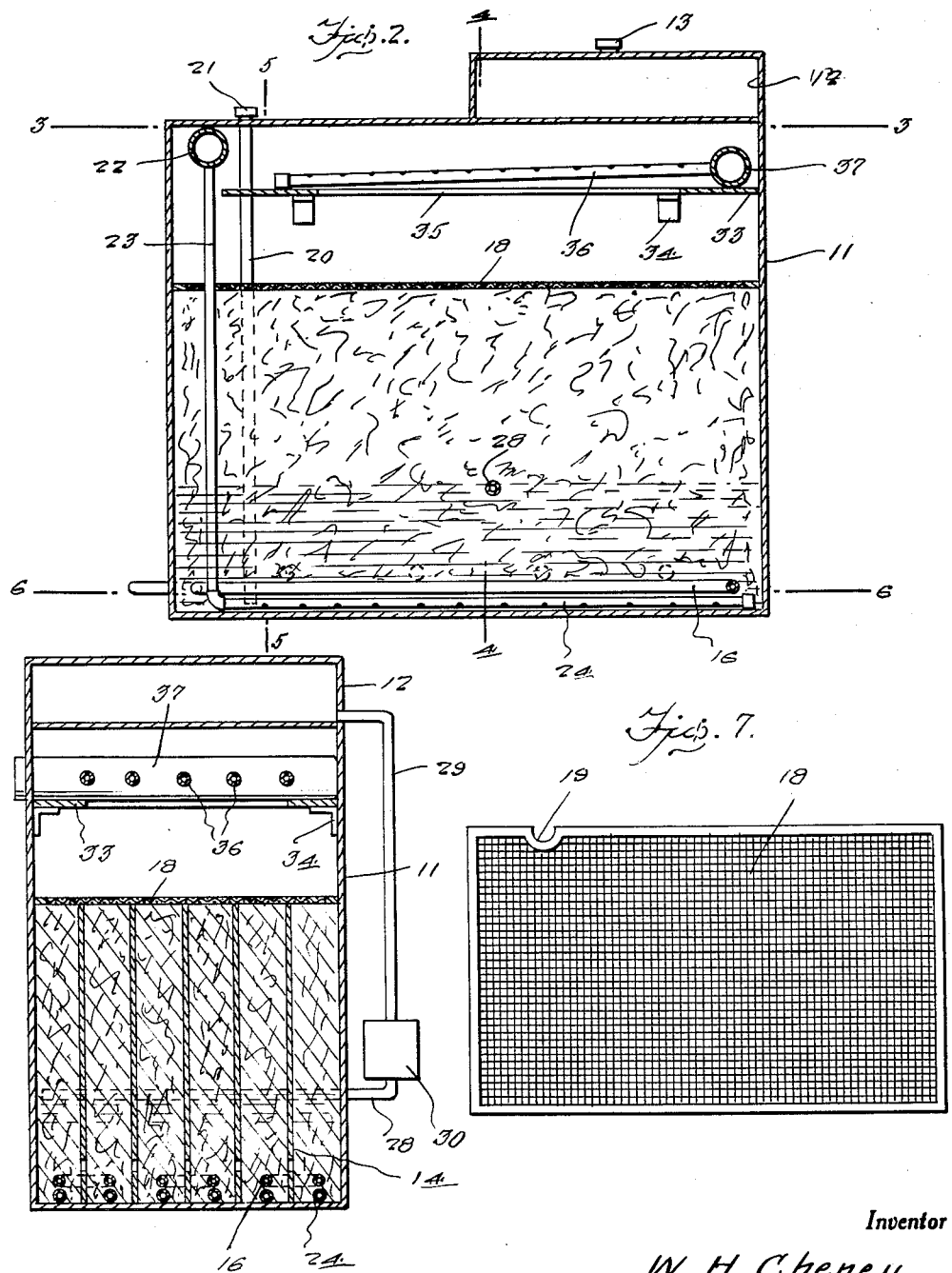
Inventor
W. H. Cheney
By Clarence A. O'Brien
Attorney Jan. 23, 1934.  W. H. CHENEY  1,944,544
GAS GENERATING DEVICE
Filed March 16, 1933  4 Sheets-Sheet 3
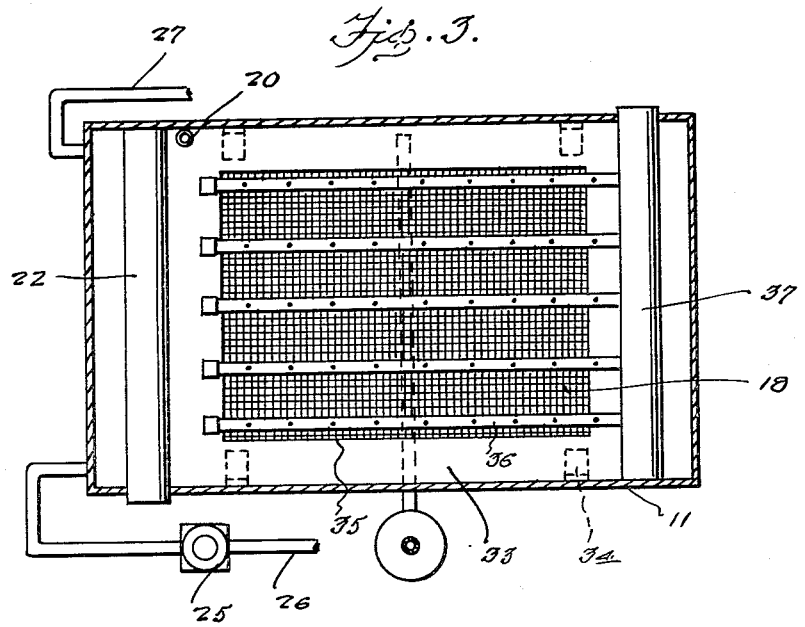
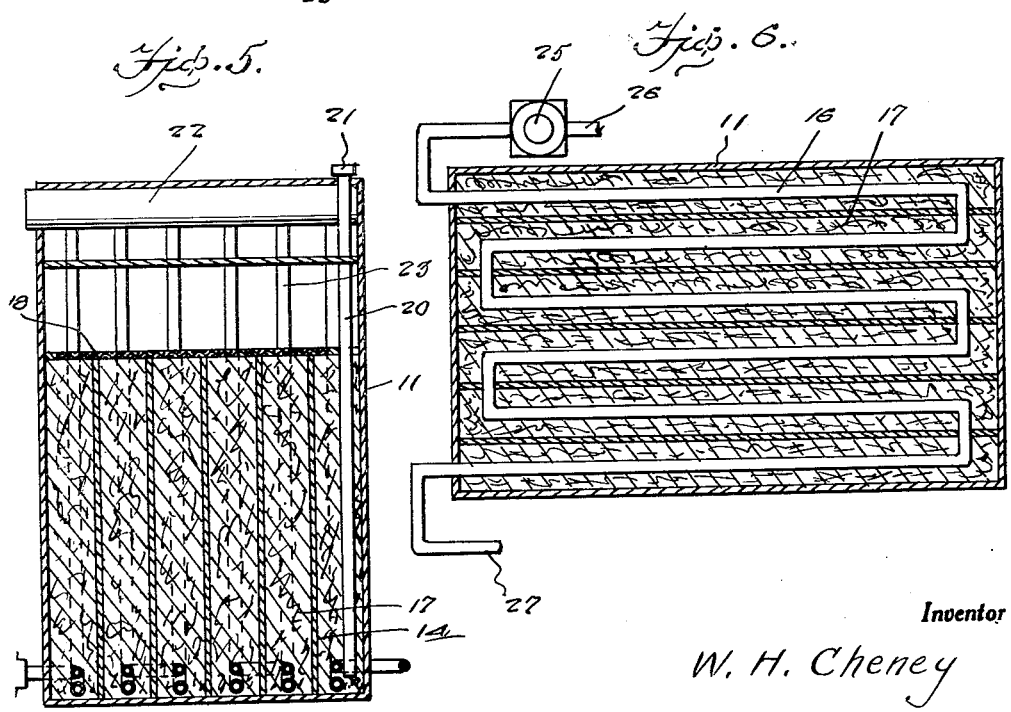
Inventor
W. H. Cheney
By Clarence A. O'Brien
Attorney Jan. 23, 1934.  W. H. CHENEY  1,944,544
GAS GENERATING DEVICE
Filed March 16, 1933  4 Sheets-Sheet 4

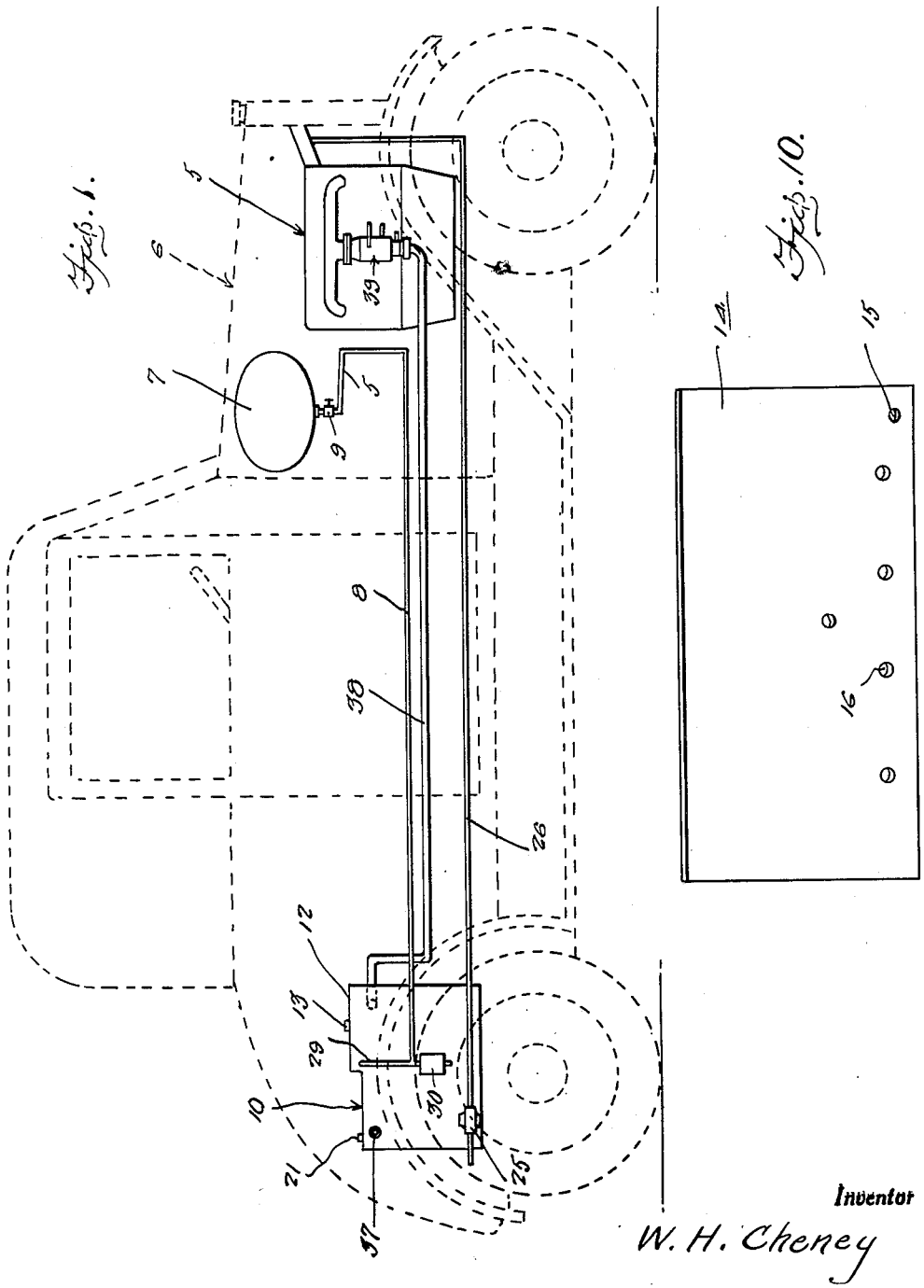

Inventor
W. H. Cheney
By Clarence A. O'Brien
Attorney

Patented Jan. 23, 1934

1,944,544

UNITED STATES PATENT OFFICE 1,944,544

GAS GENERATING DEVICE

William Henry Cheney, Chattanooga, Tenn.

Application March 16, 1933. Serial No. 661,199

3 Claims. (Cl. 261—121)

This invention appertains to gas generating mechanism, and more particularly to a generator for producing gas from gasoline, benzine and other fluids, to be used as fuel for various types of internal combustion engines.

The principal object of the invention is to provide a gas generating plant which is adapted for use on automobiles to the end that fuel can be used economically without sacrificing power.

These and various other important objects and advantages of the invention will become apparent to the reader of the following specification.

In the drawings:—

Figure 1 represents a side elevational view of an automobile in dotted lines, showing diagrammatically the gas producing plant.

Figure 2 represents a vertical sectional view through the gas generator.

Figure 3 represents a horizontal sectional view taken substantially on line 3—3 of Figure 2.

Figure 4 represents a vertical sectional view taken substantially on line 4—4 of Figure 2.

Figure 5 represents a vertical sectional view taken substantially on line 5—5 of Figure 2.

Figure 6 represents a horizontal sectional view taken substantially on line 6—6 of Figure 2.

Figure 7 represents a top plan view of the horizontal mesh partition.

Figure 10 represents a perspective view of one of the baffle plates.

Figure 8:
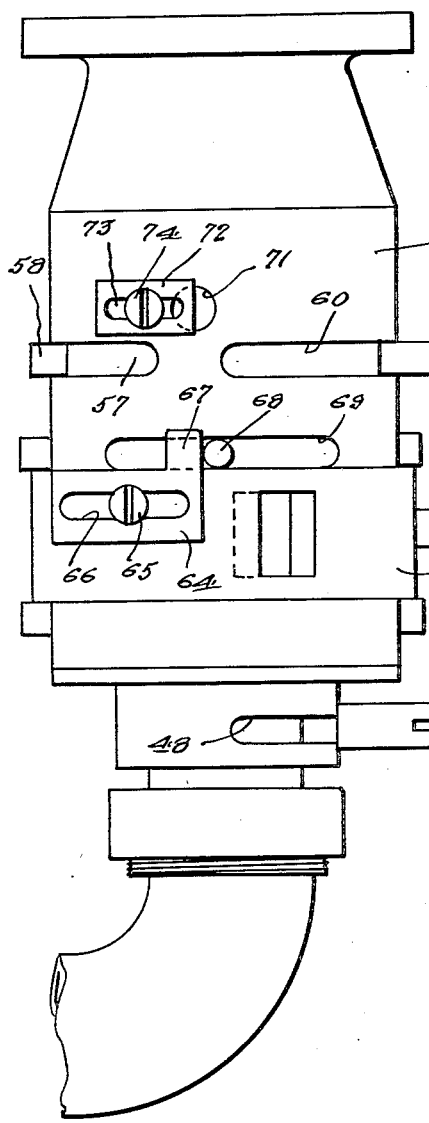
Figure 8 represents a side elevational view of the control valve.
Figure 9:
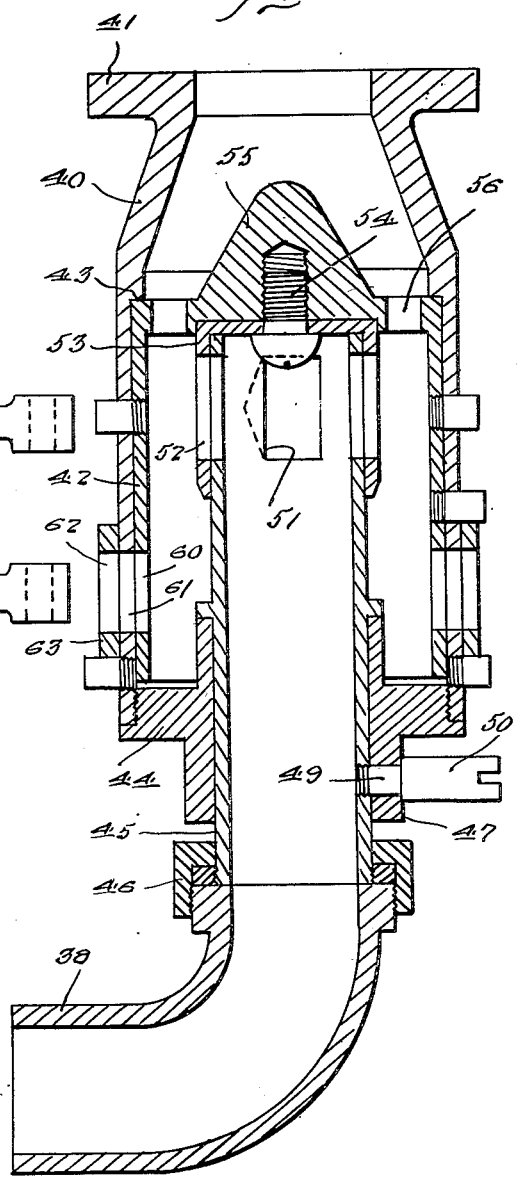
Figure 9 represents a vertical sectional view through the valve structure shown in Figure 8.

Referring to the drawings wherein like numerals designate like parts, it can be seen in Figure 1, that numeral 5 generally refers to an internal combustion engine of an automobile generally referred to by numeral 6. Preferably under the hood of the engine is located an auxiliary liquid fuel tank 7 from which extends the pipe line 8, with a shut-off valve 9 installed therein. This pipe line 8 extends to the gas generator 10 located at the rear of the automobile.

The gas generator consists of a box-like casing 11 and a liquid fuel tank 12 at the top thereof, this tank being provided with an intake 13.

Vertically disposed in the casing 11 are the baffle plates 14, each being provided with an opening 15 for receiving the hot water pipe 16 and with other by-pass openings. A suitable composition including cellulose and denoted by numeral 17 is placed between the baffles 4 and completely fills the spaces between the baffles. A horizontal mesh partition 18 rests upon the upper edges of the baffles 14 and this is notched, as at 19, to accommodate the vertically disposed emergency intake fuel pipe 20 which extends vertically through the casing 11. This pipe is open at its lower end which terminates adjacent the bottom of the casing, while its upper end is provided with a suitable closure 21.

Extending transversely within the upper portion of the casing 11 is the manifold barrel 22, one end being closed or disposed against one side wall of the casing, while its opposite end is open and disposed through the opposite side wall of the casing so that the interior of the barrel is open to the atmosphere. A plurality of pipes 23 extend downwardly from this manifold and terminate adjacent the bottom of the casing, each being provided with a horizontally disposed perforated extension 24. In this manner, air is fed to the generator at a point below the zig-zagged hot water pipe 16 which has a flight of itself disposed between each pair of the baffles 14. (See Figure 6.) A thermostatic control 25 is installed in the pipe 26 which at one end connects to the hot water pipe 16, while its opposite end connects to the intake of the automobile radiator. Numeral 27 represents the return pipe from the hot water pipe 16 and to the engine cooling system.

Extending transversely in the casing 11 is the fuel inlet pipe 28, the same being perforated so that fuel in liquid form will pass into the cellulose material between the baffles 14 at a point overlying the air pipe branches 24 and hot water pipe 16 and in the manner substantially shown in Figure 4.

A pipe 29 extends downwardly from the fuel tank 12 to connect the float operated level control 30 from where the pipe 28 extends into the casing. The auxiliary tank feed pipe 8 connects to the pipe 29 above the level control 30, as shown in Figure 1.

A platform 33 is supported by a bracket 34 within the upper portion of the casing above the partition 18, the same being provided with a relatively large rectangular shaped opening 35 therein which is crossed by the perforated branch pipe 36 projecting outwardly from the gas intake manifold 37. From this gas intake manifold extends the conduit 38 to the control valve generally referred to by the numeral 39, at the intake manifold of the engine 5.

Obviously, the liquid fuel discharged by way of the pipe 28 into the cellulose material between the baffles 14 will be heated by the hot air passing upwardly therethrough to the end that a gas is produced which will rise upwardly through the cellulose and partition 18 to be sucked into the perforated pipe 36 and manifold 37 and by way of the conduit 38 to the engine as a result of the suction action of the engine while in operation.

The control 39 consists of a shell 40 attached by a flange 41 to the intake manifold of the engine 5, while rotatable inside of this shell 40 is the cylinder 42. This cylinder is prevented longitudinal movement by the shoulder 43 at the inside of the shell 40 and the threaded plug 44 at the lower end of the shell. This plug 44 is bored to receive the elongated barrel 45 to the lower end of which is connected the conduit 38 by a suitable coupling 46. This coupling is of such construction as to permit the barrel 55 to be rotated independently of the conduit 38. The plug 44 is provided with a sleeve extension 47 having a slot 48 therein through which extends the shank 49 of a handle 50, the shank 49 being embedded in the barrel so that a swinging motion of the handle 50 will result in the rotation of the barrel 45, this to the end, that the openings 51 in the upper end portion thereof can be varied with respect to the openings 52 in the cap 53 which envelops the upper end portion of the barrel 45 and which is secured by the screw 54 to the conical shaped body 55 carried by the upper end of the aforementioned cylinder 42, which is entirely enclosed, excepting for small openings 56 therein through which gas from the interior of the cylinder 42 can pass into the engine manifold.

The cylinder 40 is provided with circumferentially extending slots 57 through which the guide pins 58 extend from the shell 40. For controlling the air mixture within the cylinder 42, an arm 59 extends through a circumferentially extending slot 60 in the shell 40 to anchor in the wall of the cylinder 42 and obviously by actuating this cylinder 42 by the handle 59, the desired positioning of the openings 60 therein with respect to the openings 61 in the shell 40 and openings 62 in the ring 63 can be obtained.

A plate 64 connected to the ring 63 by a pin 65 and slot 66 has a lug 67 thereon which acts as a stop for the pin 68 protruding through the slot 69 in the shell 40 from the cylinder 42. The ring 63 is actuated by the handle 70.

The normal air intake opening 71 in the shell 40 can be regulated in size by positioning the plate 72 partly thereover, this plate having a slot 73 through which the screw 74 threaded into the shell 40 is disposed.

Obviously, the handle 59 is operated to control the air supply while the handle 70 acts to afford a choke, while the handle 50 acts when operated as a throttle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A gas generator comprising a container, a plurality of vertical partitions in the container, porous material filling the spaces between the vertical partitions, a heater at the bottom of the said container, an air inlet below the said heater, and a liquid fuel inlet above the said air inlet and heater, the said container being provided with a gas outlet at the upper portion of the container, the said gas outlet consisting of a manifold provided with a plurality of laterally disposed branch pipes perforated and disposed over the spaces between the said partitions.

2. A gas generator comprising a container, a plurality of vertical partitions in the container, porous material filling the spaces between the vertical partitions, a heater at the bottom of the said container, an air inlet below the said heater, and a liquid fuel inlet above the said air inlet and heater, the said container being provided with a gas outlet at the upper portion of the container, the said gas outlet consisting of a manifold provided with a plurality of laterally disposed branch pipes perforated and disposed over the spaces between the said partitions, and a horizontal foraminous partition disposed over the said partitions and below the said perforated branch pipes.

3. A gas generator comprising a container, a plurality of vertical partitions in the container, porous material filling the spaces between the vertical partitions, a heater at the bottom of the said container, an air inlet below the said heater, and a liquid fuel inlet above the said air inlet and heater, the said container being provided with a gas outlet at the upper portion of the container, the said gas outlet consisting of a manifold provided with a plurality of laterally disposed branch pipes perforated and disposed over the spaces between the said partitions, and a rectangular frame-like structure for supporting the said manifold and branch pipes.

WILLIAM HENRY CHENEY.